United States Patent
Zafiroglu

(12) 
(10) Patent No.: US 7,087,285 B2
(45) Date of Patent: Aug. 8, 2006

(54) ELASTIC STITCHED COMPOSITE FABRIC USING INEXTENSIBLE YARNS

(75) Inventor: Dimitri Peter Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 205 days.

(21) Appl. No.: 10/790,905

(22) Filed: Mar. 2, 2004

(65) Prior Publication Data

US 2005/0196579 A1 Sep. 8, 2005

(51) Int. Cl.
*B32B 33/00* (2006.01)

(52) U.S. Cl. .......................... 428/95; 428/97; 442/328; 442/394

(58) Field of Classification Search ............... 428/86, 428/88, 95, 97, 105; 442/394
See application file for complete search history.

(56) References Cited

U.S. PATENT DOCUMENTS

| | | | |
|---|---|---|---|
| 1,253,050 A * | 1/1918 | Kitsee | ..................... 428/89 |
| 4,773,238 A | 9/1988 | Zafiroglu | |
| 4,876,128 A | 10/1989 | Zafiroglu | |
| 4,891,957 A | 1/1990 | Strack et al. | |
| 5,187,952 A | 2/1993 | Zafiroglu | |
| 5,376,430 A * | 12/1994 | Swenson et al. | ............ 428/152 |
| 5,624,729 A * | 4/1997 | Cohen et al. | ................. 428/90 |
| 5,826,905 A * | 10/1998 | Tochacek et al. | ........ 280/743.1 |

* cited by examiner

*Primary Examiner*—Jenna-Leigh Befumo
(74) *Attorney, Agent, or Firm*—The H.T. Than Law Group

(57) ABSTRACT

The present invention is directed to a stitch-bonded elastic polymeric composite comprising a non-fibrous elastically extensible substrate stitched with a substantially inextensible yarn system. The composite may have an optional fibrous layer stitch-bonded to the non-fibrous substrate either over or under the non-fibrous elastic substrate. The composite preferably has a shrinkage during boil-off of less than about 10%. The stitching yarn network preferably allows stretch beyond the as-stitched dimensions of about 10–100% in at least one direction, and the composite can recover from this stretch to within 5% in at least one direction.

28 Claims, No Drawings

ELASTIC STITCHED COMPOSITE FABRIC USING INEXTENSIBLE YARNS

FIELD OF THE INVENTION

This invention generally relates to a composite fabric consisting of a non-fibrous elastic polymeric sheet stitched with substantially inextensible yarns.

BACKGROUND OF THE INVENTION

Stitch-bonded elastic fabrics are generally known in the art. The elasticity of these fabrics is typically provided by an elastic stitched yarn system, which includes elastomeric yarns, composite yarns made from elastomeric yarns wrapped or tangled with hard yarns, or textured yarns. The stitch-bonded substrate can be a woven, nonwoven or knit fabric or even a film, foil or paper. The yarn system shrinks after stitching by releasing the tension on the elastomeric yarns or by subjecting the elastomeric or textured yarns to heat and moisture. The yarn shrinkage causes the substrate to gather between the stitches. When pulled, the stitch-bonded composite is elastic because the yarns stretch back and the substrate is pulled out flat again. U.S. Pat. Nos. 4,773,238, 4,876,128 and 5,187,952, issued to D. Zafiroglu, among others, describe this technique of building elastic stitched fabrics from fibrous substrate and elastic yarns. A limitation of this technique is that the substrate is buckled out-of-plane between the stitch insertion points, creating a bulky product with a characteristically "bumpy" surface, and in essence stiffening the product, because its thickness increases more than its weight as it gathers.

Another method for forming elastic stitch-bonded products, described in U.S. Pat. No. 4,891,957 issued to Strack, uses a stretched elastomeric fibrous web, stitched under tension. The yarns can be elastic or substantially inelastic. As the substrate shrinks, the yarns may buckle-up, but as the substrate/yarn composite is stretched during use, the yarns take over to reinforce the product. Thus, the yarns supply "strength" and "body," and the fibrous substrate provides the elasticity to this stitch-bonded fabric. One or more non-elastic fibrous substrates may also be stitched to this elastomeric fibrous web during the stitching process. The elastic fibrous webs used in the '957 patent tend to be expensive, and the buckled yarns and/or added fibrous webs present the same bulk, stiffness and surface unevenness problems as the gathered products using elastic stitching yarns.

Additionally, the requirement of the known fabrics to shrink and gather after stitching increases material and process costs in proportion to the shrinkage ratio, and adds the cost of finishing and heat-setting to the cost of the composite fabric.

Hence, a need exists to produce a stitch-bonded fabric with elastic properties that does not require extensive shrinkage after stitching, remains relatively flat on the surface, and, preferably, utilizes readily available lower-cost components, such as inextensible or non-elastomeric yarns and cast or extruded non-fibrous elastic films or grids.

SUMMARY OF THE INVENTION

Hence, the present invention is directed to a stitch-bonded elastic polymeric composite comprising a non-fibrous elastically extensible substrate stitched with a substantially inextensible yarn system. The composite may have an optional fibrous layer stitch-bonded to the non-fibrous substrate either over or under the non-fibrous elastic substrate. The composite preferably has a shrinkage during boil-off of less than about 10%. The stitching yarn network preferably allows stretch beyond the as-stitched dimensions of about 10–100% in at least one direction, and the composite can recover from this stretch to within about 5% in at least one direction.

In accordance with another aspect of the present invention, the elastic modulus of the composite in the stretch direction(s) within about 10–100% stretch range is less than about 400 grams per centimeter width per about 10% stretch. The non-fibrous elastic substrate can be an elastomeric polyurethane film having basis weight in the range of about 20–100 g/m$^2$, or the substrate can be a polyolefin, such as polyethylene or polypropylene film having basis weight in the range of about 20–120 g/m$^2$. The non-fibrous substrate can be a perforated or discontinuous grid.

In accordance with another aspect of the present invention, the stitching yarns can be flat or inextensible hard yarns. Alternatively, the stitching yarns can be textured yarns or a combination thereof. Suitable stitching patterns include, but are not limited to, "Ripple," "Atlas" or "Tricot" patterns. The stitching pattern may leave at least half of the technical back of the fabric partially exposed, or may fully cover the technical back. In accordance with another aspect, the non-fibrous elastic substrate amounts to at least half the weight of the composite. Preferably, the composite has a basis weight in the range of about 70 to about 350 grams/m$^2$.

In accordance with another aspect of the present invention, the composite can be elastically stretched in the cross direction. Alternatively, it can be elastically stretched in the machine direction. The composite can also be elastically stretchable in both directions.

In accordance with another aspect of the present invention, the composite can be heat treated after the stitching operation to provide elastic stretchability in at least one direction, preferably in the machine direction. The composite can shrink up to 30% to 35% and remain elastic.

In accordance with another aspect of the present invention, the non-fibrous elastically extensible substrate may contain additives, fillers, powders or flakes or the like to provide desirable properties to the composite, such as fire retardants, fragrance, antimicrobials, and shield against radio waves and/or magneto-electrical interferences.

In accordance with another aspect of the present invention, the composite can be embossed into any desirable shape. The composite can be laminated to a backing by heat pressing and melting the composite to the backing.

DETAILED DESCRIPTION OF THE PREFERRED EMBODIMENTS

The inventor of the present invention had previously observed that a shrinkable, non-fibrous substrate stitch-bonded by relatively inexpensive, inextensible yarns or textured yarns when shrunk causes the yarns to buckle out of plane, while the shrunk substrate remains relatively flat. The shrunk, stitch-bonded product is substantially inextensible and durable and has many desirable end uses. This product is fully described in commonly owned, co-pending patent application entitled "Stitch-bonded and Gathered Composite and Methods for Making Same," bearing Ser. No. 10/611,287 and filed on Jul. 1, 2003. This application is incorporated herein by reference in its entirety.

The inventor further observed that certain polymeric non-fibrous solid or perforated films, "nets," or "grids" such as polyurethane, polyethylene or polypropylene can stretch and fully recover even after being penetrated with stitching needles spaced at relatively small intervals (2–8/cm). The amount of recovery depends upon the polymer, with the polyurethanes being elastically stretchable up to 200%, and some of the polyolefins up to 35%. Unlike fibrous sheets, however, these films or grids are weakened by the stitch-needle perforations and may tear. To allow "soft stretch," these films also need to be relatively lightweight, thereby further decreasing their tear-strength. As used herein, "soft stretch" refers to a stretching force of less than about 400 gm/cm for 10% stretch.

In accordance with an aspect of the present invention, relatively elastic lightweight non-fibrous polymeric sheets or substrates are stitched with substantially inextensible, non-elastomeric yarns using stitching patterns that allow stretching without reaching the limit of elastic recovery of the elastic sheet perforated by the stitching needles. The product cannot extend beyond this limit, because the substantially inextensible yarn network locks-up. The yarn network may contain textured polymeric yarns or a combination of hard and textured yarns. The composite may also be shrunk after stitching so long as its elastic modulus remains relatively low to preserve "soft-stretch."

In accordance with another aspect of the present invention, these non-fibrous polymeric substrates do not require extensive gathering or shrinking to become elastic. Also whether it is post-shrunk or not, the composite preferably shrinks less than 10% when subjected to boiling water during washing cycles, and preferably will not shrink when dried at temperatures under about 150° C., more preferably under about 120° C. The preferred drying temperatures are within the range used in most dryers, i.e., under 120° C. The product of the present invention is a soft, flexible, drapeable fabric that can be dyed in boiling water without substantial shrinking, and remains elastic in at least one direction after multiple washings and dryings.

Another advantage of this invention is that the polymeric non-fibrous elastic substrates can provide additional color and other decorative effects (shiny, dull, textured, partially exposed film surfaces, etc.). Moreover, the non-fibrous polymeric elastic substrates can be in the form of a non-fibrous grid or "mesh," and can also contain fillers, such as fibers, fibrils or powders. The fillers can be glass, metal, carbonaceous, polymeric, etc. For example, fiberglass fillers are fire resistant and metallic powders provide electromagnetic or radiation shields (EMI/RFI protection). Other additives can provide anti-bacterial or anti-microbial protection. Others can provide fragrance to the substrates.

The non-fibrous polymeric elastic substrates can be stitched or built with colored yarns and colored films or grids to create composite with special visual effects. The stitch-bonded composites can be dyed, providing that the processing temperatures are kept relatively low so as not to melt or harden the non-fibrous polymeric substrates. The stitch-bonded non-fibrous polymeric substrates or composites containing same can also be permanently embossed into durable/reusable three dimensional elastic fabrics using embossing patterns that allow stretch between embossments. The embossing process can reach temperatures well above 125° C. with the areas between the embossments left intact, resulting in highly textured, soft and still elastic structures. This embossed product can be washed and dried without losing their elasticity or texture and without pilling. Suitable embossing techniques are disclosed in commonly owned, co-pending patent application entitled "Textured Composite Material," bearing Ser. No. 10/611,470 and filed on Jul. 1, 2003. This application is incorporated herein by reference in its entirety.

In accordance with another embodiment of the present invention, suitable non-fibrous polymeric substrates include low-cost polymeric films or sheets. Such films include polyolefin films with basis weight in the range of 0.5 to 4 oz/yd$^2$ (or about 16.9 to about 118.5 grams/m$^2$), because of their relatively low cost and their elastic stretchability, which can be up to 30–35% using low stretching forces. Preferred stitch frequencies are in the range of 6–18/inch across (6 to 18 gauges) and 7–20 CPI (7 to 20 penetrations per inch in the machine direction). The perforating action of the needles softens these polyolefin films, and reduces the force necessary to stretch them. On the other hand, as the films are softened, the stitching yarn networks lock-up to prevent further stretching and keep the films from tearing. So long as the tear point is not reached, the perforated films provide the elastic force needed to recover from relatively small elongations, e.g., between 15 and 30%.

The inventor has also found that thin polyolefin films, e.g., having basis weight in the range of 0.5 to 4.0 oz/yd$^2$ (or about 16.9 to about 118.5 grams/m$^2$), can be shrunk by heating to temperatures near their melting temperatures (around 130–150° C. for polyethylene) and remain elastic. This enables shrinkage in the machine direction, so that the substantially inextensible overlaps of the stitching yarns can buckle or curl as they accommodate the shrinkage, and subsequently allow machine direction elastic stretch as the shrunk film stretches elastically and the yarn overlaps are pulled straight and taut. Preferably, the stitched composite has a total basis weight in the range of about 70 to about 350 grams/m$^2$.

In accordance with another embodiment of the present invention, preferred non-fibrous polymeric substrates also include elastomeric films, such as polyurethane. Elastomeric films when stitched with inextensible yarns can also be heat-shrunk to allow machine-direction elasticity. Elastomeric films can provide substantial levels of cross-stretching, when stitched with yarn systems allowing high cross stretching. The basis weight of the polyurethane sheet is in a range of about 20 grams/m$^2$ to about 100 grams/m$^2$.

The non-fibrous elastomeric or polyolefin films or grids, when perforated, offer the additional advantage of being less damaged by the needle perforation action of the stitching process.

Suitable stitching yarns include "hard" flat polyester, nylon, acrylic, or polypropylene yarns or their textured equivalents. Suitable yarns further include any synthetic or natural yarns that are substantially inextensible. Preferably, the stitching patterns are selected to allow cross-direction stretching without requiring cross-direction shrinkage after the stitching process. This can be achieved by balancing the stitch frequency (CPI or stitches per inch) in view of the cross-travel of the underlaps. The underlap cross angle should be such that the product allows no more stretch than what the needle-perforated elastic film can bear. Suitable stitch patterns for cross-directional stretch include, but are not limited to, stitching systems utilizing inextensible hard or flat yarns or non-elastomeric stretch textured yarns stitched in highly cross-extensible stitch patterns, such as a "Ripple" pattern (such as 1-0,1-0,1-2,1-2), or an "Atlas" pattern (such as 1-0,1-0,2-1,2-1,2-3,2-3,1-2,1-2), or a single-spaced Tricot pattern (such as 1-0,1 -2). Such stitch patterns allow extensive cross stretching, especially when used in conjunction with relatively close-spaced and long (high gauge and low CPI) stitches. Stitching for high cross-direction stretch is fully disclosed in co-pending patent application entitled, "Stitch-bonded Fabrics Utilizing Stretchable Substrates," bearing Ser. No. 10/725,238 and filed on Dec. 1, 2003. This application is incorporated herein by reference in its entirety.

In accordance with another aspect of the present invention, the non-fibrous polymeric elastic substrates preferably do not shrink, warp or otherwise change when subjected to boiling water and/or ambient temperatures under 125° C. Preferably, the stitched non-fibrous polymeric elastic composites also do not shrink when subject to boiling water and/or ambient temperatures under 125° C., before being subjected to any finishing processes. Shrinkage of the stitched substrates, if any, can, however, be performed at temperatures above 125° C., so long as the product are not affected by hot washing and drying at moderate temperatures, under 125° C.

In accordance with another aspect of the present invention, fibrous substrates can be optionally stitched over or under non-fibrous polymeric elastic substrates to form composites to improve textile hand or bulk. Such composites may be used with and without shrinkage after being stitched. Bulky fibrous substrates (needled or spunlaced webs, bulked knits, etc.) are preferred, because they can be gathered within their plane and do not substantially buckle out-of-plane when the composites shrink.

The elastic properties of the products of this invention originate from the non-fibrous polymeric elastic substrates, and not substantially from the stitching yarns. Even if the stitching yarns are textured and are bulkable (such as textured polyesters, polypropylenes or nylons) the product does not change dimensions or shrink in boiling water to a significant degree. Preferably, the product changes (shrinks or grows) less than 10% at water boil, in either direction, as demonstrated in the following examples.

EXAMPLES

In the following examples, non-fibrous, elastic polyolefin films having thickness in the range of about 2.5 to about 3.5 mils (0.6 to 0.85 mm) and basis weight in the range of 1.6 to 2.3 oz/yd$^2$ (54 to 78 gm/m$^2$) are stitch-bonded with inextensible flat or textured yarns to produce one-direction or two-direction soft, elastic and stretchable fabrics, with or without added fibrous layers. The elastic properties of the fabrics are substantially controlled by the films and not by the yarns. To allow machine direction elastic stretch, the product is heated to elevated temperatures that shrink the films in the machine direction and loosen the underlaps. The composites do not substantially shrink at boil-off (~100° C.), even when the stitching yarns are textured yarns. As used herein, boil-off includes immersion in boiling water for about 2 minutes or more. Elastic stretch is limited to the range of about 10–30%. Higher stretch levels can be obtained using elastomeric films, such as polyurethane films (not included in the following Examples).

Two relatively thin polyethylene films, a black film having a thickness of about 2.5 mils and a clear film having a thickness of about 3.5 mils, were purchased from AEP Industries in Charlotte, N.C., and were used in the Examples below. A thicker black film having a thickness of about 6.5 mils was used in comparative Examples C and D. The thicker film required high stretching forces, and did not truly recover from stretch over 10–15%, even after being shrunk by heat treating at 150° C.

An optional fibrous web was added in Examples 1, 2, 7 and 8. The fibrous web is a carded directional web made from 1.5 denier, 1.5 inch polyester fibers, and has a basis weight of about 0.7 oz/yd$^2$. The fibrous web contains about 20% Kosa type 252 sheath-core binder/core fibers and 80% Wellman type 310 polyester fibers, activated/bonded at 210° C.

The stitching system comprises two types of polyester yarns: a 150 denier, 34 filament flat yarn, and a 150 denier, 34 filament textured yarn from Unify in North Carolina. Two opposing tricot stitches (1-0/2-3 and 2-3/1-0) were applied with two knitting bars at 14 gauge and 14 CPI in all cases, some with the flat hard/inextensible yarns, and some with the textured versions of the hard/inextensible yarns. This stitching system allows a cross-stretch of approximately 30% before the stitching yarns lock-up, but allows negligible machine direction stretch. To allow machine direction stretch (Examples 2, 4, 6, 8, 10 and 12) the stitched film/composite was heated to 150° C. for 30 seconds to produce up to 35% machine direction shrinkage.

The shrinkage and stretch levels shown in Table I are within 5% increments (i.e., a reading of 18% was recorded as 20%, and 12% was recorded as 10%, etc.) In this embodiment, the 5% increments are appropriate, because the measurements of shrinkage and stitch have an uncertainty range of about ±3–5%.

In all the Examples below and specifically in Examples 1–12, the force applied to the products to achieve about 10% stretch is any direction remained below about 400 grams/cm of width. (See Table II). The applied force can approach the elastic modulus limit of 400 grams/cm/10% stretch for the shrunk product when the film's basis weight exceeds approximately 100 grams/m$^2$. Hence, in accordance with one aspect of the present invention, the basis weight of the non-fibrous polymeric substrates is about 120 grams/m$^2$ or less.

Comparative Example A

This example demonstrates conventional fabrics. The carded web was stitched with two textured yarns. As it exited the stitch-bonder the composite had approximately 5% stretch in the machine direction before it "locked", which it recovered after being allowed to relax. It could be stretched up to 35% in the cross direction but it was not able to recover from more than 10% cross-stretch without acquiring a set of at least 5%. Therefore the "elastic" stretch is listed as 5% and 10% for the machine and cross directions.

The stitched product was immersed in boiling water for 1 minute and dried in a hot air circulating oven heated to 120° C. It shrunk by about 30 and 35% in the machine and cross directions and could withstand 25% machine direction stretch and 30% cross direction stretch without acquiring a set over 5%. The textured yarns were activated and then relaxed, and acquired a sinusoidal/helical configuration forcing the nonwoven to buckle, as expected.

Comparative Example B

The carded web used Example A was stitched with flat/hard polyester yarns in the same manner as Example A. The stitched product had negligible elastic stretch, as expected. Boil-off produced negligible shrinkage or elastic stretch, also as expected.

Example 1

The carded web was stitched together with the black 2.5 mil polyethylene film with two flat/hard polyester yarns. The stretch property in the machine direction did not change; however, the composite stretches and recovers from up to 25% strain in the cross direction due to the elastic recovery of the film. Immersing the product in boiling water did not cause any significant shrinkage and did not change the elastic stretch property of the composite.

Example 2

The composite of Example 1 was heated to 150° C. for 1 minute in an air-circulating oven. It shrunk 20% in the machine direction and 5% in the cross direction. The shrinking buckled the flat stitching yarns slightly above the surface of the composite. The nonwoven web also buckled slightly.

The heat-shrunk composite was essentially unchanged when immersed in boiling water. The shrunk composite had a balanced elastic recoverable stretch of approximately 15% in the machine direction and 25% in the cross direction. Boil-off after the 150° C. heat treatment did not affect the elastic stretch properties, but did somewhat soften the composite.

Examples 3 and 4

Examples 3 and 4 are substantially similar to Examples 1 and 2, respectively, except that the carded web was omitted. Only the black 2.5 mil polyethylene film was stitched. The overall results were very similar, with two slight exceptions. First, the elastic cross stretch of the stitched and boiled-off film (Example 3) was 5% higher, and second the 150° C. heat treated, stitched and boiled-off film (Example 4) grew 5% in the cross-direction rather than shrunk.

Without being bound to any particular theories, the inventor believes that the small amounts of expansion may be attributed to the dominance of machine direction shrinkage and simultaneous thermal expansion of the film in the cross direction that could not be recovered before cooling. The expansion may also be attributed to the absence of the carded web that was in Example 2. The carded web might have prevented thermal expansion in the cross direction.

Examples 5 and 6

Examples 5 and 6 were substantially similar to Examples 3 and 4, respectively, except that textured stitching yarns were used instead of flat yarns that were used in Examples 3 and 4. Surprisingly, the elastic stretch properties did not change to a substantial degree. This is attributed to the dominating role of the elastic substrate, i.e., the thin polyethylene film, relative to the yarn system.

Examples 7 to 12

Examples 7–12 are substantially similar to Examples 1–6, except that the clear 3.5 mil polyethylene film replaced the black 2.5 mil polyethylene film. The differences in elastic stretch properties between the two sets were very small. The level of elastic stretch with full recovery increased somewhat, especially in the machine direction, probably due to the higher elastic and shrinking power of the heavier film.

Comparative Examples C and D

The flat stitching yarns were applied to the 6.5 mil thick (141 grams/m$^2$) polyethylene film, with an added web on top. As shown on Table 1, the stitched film had negligible machine direction stretch as stitched or after boil-off. It could stretch up to 25% in the cross direction using very high force levels, i.e, above 400 grams/cm/10% stretch (Table II), with rather low recovery (set of 10–15%). When subjected to heat shrinkage at 150° C., the stitched film's basis weight increased to about 185 grams/m$^2$ and the stitched, shrunk film required higher force, i.e., above 1000 grams/cm/10% to stretch (Item D, Table II). Comparative Examples C and D are comparable to the fabrics and composites disclosed and claimed in commonly owned, co-pending '287 application.

TABLE I

| Example | Fibrous Web | Polyolefin Film | Yarns Bar 1 | Yarns Bar 2 | Elastic Stretch as Stitched MD/XD (%) | Boil Off Shrinkage MD/XD (%) | Elastic Stretch After Boil Off (%) | 150° C. Shrinkage MD/XD (%) | Boil Off After 150° C. (%) | Elastic Stretch After 150° C. (%) |
|---|---|---|---|---|---|---|---|---|---|---|
| A | Yes | None | Text | Text | 5/10 | 30/35 | 25/30 | NA | NA | NA |
| B | Yes | None | Flat | Flat | 0/5 | 0/0 | 5/5 | NA | NA | NA |
| C | Yes | 6.5 mil | Flat | Flat | 0/25* | 0/0 | 5/25* | NA | NA | NA |
| D | Yes | 6.5 mil | Flat | Flat | 0/25* | NA | NA | 35/−5 | 0/0 | 20*/20* |
| 1 | Yes | 2.5 mil | Flat | Flat | 0/25 | 5/0 | 5/25 | NA | NA | NA |
| 2 | Yes | 2.5 mil | Flat | Flat | 0/25 | NA | NA | 20/5 | 0/0 | 15/25 |
| 3 | No | 2.5 mil | Flat | Flat | 0/30 | 5/0 | 5/30 | NA | NA | NA |
| 4 | No | 2.5 mil | Flat | Flat | 0/30 | NA | NA | 30/−5 | 0/0 | 20/25 |
| 5 | No | 2.5 mil | Text | Text | 0/30 | 5/0 | 5/30 | NA | NA | NA |
| 6 | No | 2.5 mil | Text | Text | 0/30 | NA | NA | 30/−5 | 0/0 | 20/20 |
| 7 | Yes | 3.5 mil | Flat | Flat | 0/25 | 0/0 | 5/25 | NA | NA | NA |
| 8 | Yes | 3.5 mil | Flat | Flat | 0/25 | NA | NA | 30/0 | 0/0 | 20/20 |
| 9 | No | 3.5 mil | Flat | Flat | 0/30 | 0/0 | 5/30 | NA | NA | NA |
| 10 | No | 3.5 mil | Flat | Flat | 0/30 | NA | NA | 35/5 | 0/0 | 25/25 |
| 11 | No | 3.5 mil | Text | Text | 0/30 | 5/0 | 5/30 | NA | NA | NA |
| 12 | No | 3.5 mil | Text | Text | 0/30 | NA | NA | 35/−5 | 0/0 | 25/25 |

*denotes non-recoverable stretch

TABLE II

| | Stitched % Stretch/Force (g/cm) /Force per 10% Stretch | | Boiled/Off % Stretch/Force (g/cm) /Force per 10% Stretch (g/cm) | | 150° C. Shrunk % Stretch/Force (g/cm) /Force per 10% Stretch (g/cm) | |
|---|---|---|---|---|---|---|
| Example | MD | XD | MD | XD | MD | XD |
| A | 5/110/220 | 10/50/50 | 25/130/52 | 30/60/20 | — | — |
| B | — | 5/50/100 | 5/80/160 | 5/120/24 | — | — |
| C | — | 25/1800/720 | 5/410/820 | 25/2000/800 | — | — |
| D | — | 25/1920/768 | — | — | 20/2600/1300 | 20/2300/1150 |

TABLE II-continued

| | Stitched % Stretch/Force (g/cm) /Force per 10% Stretch | | Boiled/Off % Stretch/Force (g/cm) /Force per 10% Stretch (g/cm) | | 150° C. Shrunk % Stretch/Force (g/cm) /Force per 10% Stretch (g/cm) | |
|---|---|---|---|---|---|---|
| Example | MD | XD | MD | XD | MD | XD |
| 1 | — | 25/380/152 | 5/80/160 | 25/280/112 | — | — |
| 2 | — | — | — | — | 15/380/ | 25/630/252 |
| 3 | — | 30/400/133 | 5/70/140 | 30/350/116 | — | — |
| 4 | — | — | — | — | 20/480 | 25/720/288 |
| 5 | — | 30/320/106 | 5/100/200 | 30/340/113 | — | — |
| 6 | — | — | — | — | 20/510/ | 20/700/350 |
| 7 | — | 25/530/212 | 5/170/240 | 25/510/204 | — | — |
| 8 | — | — | — | — | 20/560/280 | 20/730/365 |
| 9 | — | 30/670/223 | 5/190/180 | 30/570/190 | — | — |
| 10 | — | — | — | — | 25/580/232 | 25/780/312 |
| 11 | — | 30/580/193 | 5/190/180 | 30/620/207 | — | — |
| 12 | — | — | — | — | 25/590/236 | 25/800/320 |

* BOLD denotes non recoverable stretch or outside the present invention (over 400 gm/cm/10% stretch).

While it is apparent that the illustrative embodiments of the invention disclosed herein fulfill the objectives stated above, it is appreciated that numerous modifications and other embodiments may be devised by those skilled in the art. One such modification is that elastomeric films or grids can be used to produce higher levels of elastic stretch. Therefore, it will be understood that the appended claims are intended to cover all such modifications and embodiments, which would come within the spirit and scope of the present invention.

I claim:

1. A stitch-bonded elastic composite comprising a non-fibrous elastic sheet, stitch-bonded in a substantially unstretched state with substantially inextensible yarns, wherein the composite can elastically recover from 10–100% stretch within 5%, in at least one direction, wherein the stitch-bonded substantially inextensible yarns comprise a stitched yarn network that allows stretch beyond as-stitched dimensions of 10–100%, in at least a machine or transverse direction and the composite has an elastic modulus in the stretch direction of less than about 400 grams per centimeter width per 10% stretch.

2. The stitch-bonded elastic composite of claim 1, wherein the elastic sheet has a boil-off shrinkage in any direction of less than about 10%.

3. The stitch-bonded elastic composite of claim 1, wherein the elastic sheet comprises a polyolefin sheet.

4. The stitch-bonded elastic composite of claim 3, wherein the polyolefin sheet comprises polyethylene or polypropylene.

5. The stitch-bonded elastic composite of claim 3, wherein the basis weight of the polyolefin sheet is in a range of about 20 grams/m² to about 120 grams/m².

6. The stitch-bonded elastic composite of claim 1, wherein the elastic sheet comprises polyurethane.

7. The stitch-bonded elastic composite of claim 6, wherein the basis weight of the polyurethane sheet is in a range of about 20 grams/m² to about 100 grams/m².

8. The stitch-bonded elastic composite of claim 1, wherein the elastic sheet is non-continuous.

9. The stitch-bonded elastic composite of claim 8, wherein the elastic sheet is perforated.

10. The stitch-bonded elastic composite of claim 1, wherein the stitched yarns comprise hard/nonelastomeric flat or textured yarns.

11. The stitch-bonded elastic composite of claim 1, wherein the stretch is in the cross direction.

12. The stitch-bonded elastic composite of claim 11, wherein the stretch is also in the machine direction.

13. The stitch-bonded elastic composite of claim 1, wherein the stretch is in the machine direction.

14. The stitch-bonded elastic composite of claim 1, wherein the yarn system comprises Ripple, Atlas, or Tricot pattern.

15. The stitch-bonded elastic composite of claim 1, wherein the elastic sheet comprises of more than about half of the composite's weight.

16. The stitch-bonded elastic composite of claim 1, wherein the composite is partially exposed on its technical back.

17. The stitch-bonded elastic composite of claim 1, wherein the composite is fully covered with yarn overlaps on its technical back.

18. The stitch-bonded elastic composite of claim 1, wherein the basis weight of the composite is in a range of about 70 to about 350 grams/m².

19. The stitch-bonded elastic composite of claim 1 further comprises a fibrous layer stitch-bonded to the elastic sheet.

20. The stitch-bonded elastic composite of claim 19, wherein the fibrous layer is on top of the elastic sheet.

21. The stitch-bonded elastic composite of claim 19, wherein the fibrous layer is on the bottom of the elastic sheet.

22. The stitch-bonded elastic composite of claim 1, wherein the elastic sheet comprises fillers.

23. The stitch-bonded elastic composite of claim 22, wherein the fillers comprise fibers, fibrils, dust or powders.

24. The stitch-bonded elastic composite of claim 22, wherein the fillers comprise glass, metal, carbonaceous or polymeric materials.

25. The stitch-bonded elastic composite of claim 1, wherein the elastic sheet is capable of shrinking up to about 35% after being heat treated and remains elastic.

26. The stitch-bonded elastic composite of claim 1 being embossed.

27. The stitch-bonded elastic composite of claim 1 being laminated to another layer by melting the elastic sheet.

28. The stitch-bonded elastic composite of claim 27, wherein the laminate comprises a smooth surface.

* * * * *